Patented Oct. 14, 1930

1,778,159

UNITED STATES PATENT OFFICE

ARTHUR LUETTRINGHAUS, OF MANNHEIM, AND PAUL NAWIASKY AND ALFRED EHRHARDT, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

THIOPHENE DERIVATIVES OF THE BENZANTHRONE SERIES AND PROCESS OF PREPARING THE SAME

No Drawing. Application filed November 30, 1928, Serial No. 322,962, and in Germany December 2, 1927.

The present invention relates to the production of new condensation products of Bzl-benzanthronyl-thioglycollic acid or derivatives and substitution products thereof which are soluble in alkalis, and vat dyestuffs obtainable therefrom.

We have found that valuable condensation products of the benzanthrone series are produced when Bzl-benzanthronyl-thioglycollic acid, or substitution products thereof with unoccupied 2-position, are treated with alkaline condensing agents. New products, soluble in alkali, are so produced together with inconsiderable or larger amounts, according to the method of working employed, of compounds insoluble in alkali or leuco-compounds of vat dyestuffs, which can be readily separated by filtration either directly, or after careful oxidation of the leuco compounds after the reaction mass has been diluted with water. The alkali soluble products are readily precipitated from an aqueous solution thereof even by weak acids.

By a treatment with mild oxidizing agents, the aforesaid new condensation products undergo further condensation into blue green substances possessing the character of vat dyestuffs. This condensation can be effected, for example, by the introduction of air into the warmed alkaline solution, or by the addition of other oxidizing agents, such as ammonium persulfate, to the alkaline solution. The oxidation may, however, also be effected by heating the dried intermediate products with nitrobenzene or with inert solvents, as for example trichlorbenzene, o-dichlorbenzene, naphthalene and the like, in the presence of air, or by warming their solution in highly concentrated sulfuric acid for a short time, whereby, however, sulfonation easily takes place. The progress of the reaction for the formation of these alkali soluble condensation products and their resulting condensation products which give blue green dyeings from the vat, may probably be represented somewhat as follows:

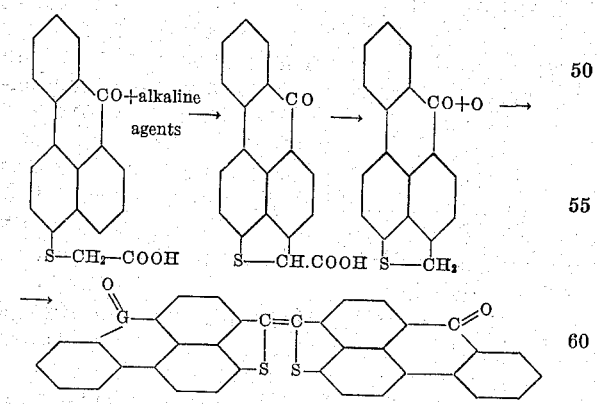

Moreover, the esters, amides, nitriles and similar derivatives derived from the Bzl-benzanthronyl-thioglycollic acids, which by saponification are converted into Bzl-benzanthronyl-thioglycollic acid, with unoccupied 2-positions, and their substitution products and derivatives can be subjected to the action of alkaline condensing agents, preferably in the absence of water. The result being that primary condensation products are obtained which are analogous to those above described, the main difference as regards their properties being that they are, generally speaking, substantially more stable towards mild oxidizing agents, under the action of which they are only gradually and incompletely converted into the said blue green condensation products with the properties of vat dyestuffs. With aqueous alcoholic alkalis the said condensation products form, for the most part, intensively colored solutions with strong fluorescence. After exposure to the action of saponifying agents, they behave in precisely the same manner as the condensation products of the free acids herein described, inasmuch as, like those, they are converted by weak oxidizing agents, into other condensation products possessing the character of vat dyestuffs.

The following examples will further illustrate the nature of the said invention which, however, is not limited thereto. The parts are by weight.

*Example 1*

150 parts of solid potassium hydroxid are warmed to 170° C. with 50 parts of water, whereupon 30 parts of Bzl-benzanthronyl-thioglycollic acid, with the melting point 220° C., are introduced into the melt at the same temperature. The temperature is then raised, while stirring, to 195° C., and the mixture is maintained for half an hour at from 195° to 200° C. The melt is then allowed to cool, is diluted with 3000 parts of water at 40° C., filtered off from the insolubles and treated with dilute hydrochloric acid until no further precipitation occurs. The brownish orange precipitate is dried, and is boiled with 20 parts of nitrobenzene for a quarter of an hour, in order to convert it into the blue green condensation product. The solution acquires a green color, and the condensation product gradually separates out, for the most part in the form of lustrous dark blue needles. It is cooled down to 110° C., filtered, thoroughly washed with warm nitrobenzene and benzene, and dried.

The conversion of the intermediate product into the colored final product may also be effected by warming the filtered alkaline solution to 70° C. and passing air therethrough at that temperature, until no further increase in precipitation occurs. The crude dyestuff is filtered off, dried and purified, as for example by extraction with boiling inert organic solvents, such as nitrobenzene. The intermediate product may also be dissolved in 90 per cent sulfuric acid, and the solution be maintained at from 95° to 100° C. for 30 minutes. The final product separates out on dilution with water. The purification can also in this case be effected by boiling with inert solvents.

On precipitation from a solution in concentrated sulfuric acid, in which it dissolves sparingly with a brownish violet color, the colored condensation product forms a blue green paste, which gives blue dyeings on cotton from a blue vat. On exposure to the air the color changes into an extremely fast blue green.

If Bzl-benzanthronyl-thioglycollic acid be replaced by 6-chlor-Bzl-benzanthronyl-thioglycollic acid, a similar product, giving blue green dyeings, is obtained.

Potassium hydroxid may be replaced by an equimolecular mixture of potassium hydroxid and sodium hydroxid in the presence or absence of water.

*Example 2*

10 parts of Bzl-benzanthronyl-thioglycollic acid are introduced into a mixture of 400 parts of anhydrous pyridine and 40 parts of potassium hydroxid, heated to 90° C., the melt then being kept for some hours at 90° C. The color of the pyridine solution thereby turns slowly from brown to a dark blue. When no further change of the color occurs, the cooled mixture is introduced into diluted acid, whereby a brown product is precipitated, which then is transformed after filtering by suction and drying as described in Example 1 into the blue green condensation product there referred to.

*Example 3*

5 parts of the ethyl ester of Bzl-benzanthronyl-thioglycollic acid, of a melting point from 135° to 138° C., prepared by heating Bzl-benzanthronyl-thioglycollic acid with ethyl alcohol and a little concentrated sulfuric acid, and 5 parts of solid potassium hydroxid are introduced into 100 parts of pyridine, and stirred until the color of the reaction mixture ceases to change. The brownish red melt is then stirred into water containing an excess of hydrochloric acid, and the product is filtered off, washed with cold water and carefully dried. For purification, it may be extracted, for example, with a little alcohol. It is then sparingly soluble in sodium carbonate solution, fairly soluble, with reddish orange color and yellow green fluorescence, in dilute caustic soda solution, and far more readily soluble in alcoholic aqueous caustic soda solution, the solution having an intensive red color, with orange yellow fluorescence. In 66° Bé. sulfuric acid, a blue solution with greenish tinge and red fluorescence is obtained.

For conversion into the condensation product of vat dyestuff character, described in Example 1, a suitable method is to heat 2 parts of the crude product with 15 parts of 30° Bé. caustic soda solution and 25 parts of water, to boiling for an hour. Precipitation is then effected with dilute hydrochloric acid, and the separated product is further treated in the same manner as the first condensation product obtained in Example 1, with which it is identical.

In place of the ethyl ester of Bzl-benzanthronyl-thioglycollic acid, other esters of the Bzl-benzanthronyl-thioglycollic acids can be subjected to the action of alkaline condensing agents in a similar manner.

Example 4

5 parts of Bzl-benzanthronyl-thioglycollonitrile, of a melting point from 205° to 208° C., which has probably the formula:

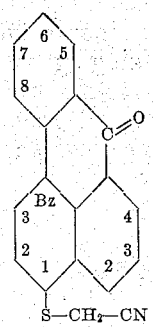

and which may be prepared for example by condensing sodium Bzl-benzanthronyl-mercaptid with monochloracetonitrile, and 10 parts of powdered potassium hydroxid are introduced, while stirring, into 100 parts of pyridine, and stirring is continued until the color of the reaction mixture ceases to change, which will be the case, for example, after about 72 hours. The color will then be blue with a reddish tinge. The melt is stirred into ice water containing an excess of hydrochloric acid, and the product is filtered off, washed with water and boiled several times with a little alcohol. The product left undissolved by the alcohol can be recrystallized, for example, from monochlorbenzene. The compound is insoluble in sodium carbonate solution, sparingly soluble, with reddish color and yellow fluorescence, in dilute caustic soda solution, and soluble with intense red color with a bluish tinge and yellow fluorescence, in alcoholic caustic soda solution. The solution in concentrated sulfuric acid is blue, with greenish tinge and red fluorescence.

For conversion into the condensation product with vat dyestuff character, the product may be treated, for example, in the manner described in Example 3. In this case the treatment with the aqueous solution of alkali is prolonged until the evolution of ammonia ceases.

In a similar manner to that employed with benzanthronyl-thioglycollonitrile, the Bzl-benzanthronyl-thioglycollic amid, melting point 258° to 260° C., obtainable for example, from the said nitrile by treatment with sulfuric acid at ordinary temperature, can be employed.

What we claim is:—

1. A process for the production of condensation products of the benzanthrone series which comprises acting on a compound corresponding to the formula:

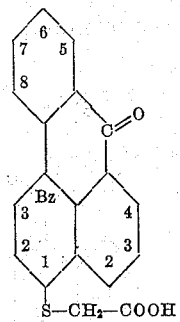

in which the 2-position must be free and the carboxylic group may be substituted by such other groups as are capable of being saponified to a carboxylic group, with an alkaline condensing agent.

2. A process for the production of vat dyestuffs of the benzanthrone series which comprises acting on a compound corresponding to the formula:

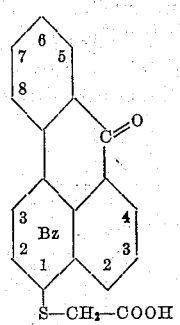

in which the 2-position must be free and the carboxylic group may be substituted by such other groups as are capable of being saponified to a carboxylic group, with an alkaline condensing agent, and converting the condensation product into a vat dyestuff by the action of a mild oxidizing agent.

3. A process for the production of condensation products of the benzanthrone series which comprises acting on a compound corresponding to the formula:

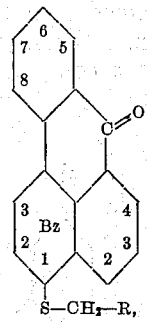

in which R stands for a group capable of being saponified into a carboxylic group, with an alkaline condensing agent and precipitating the condensation product by dilute acid.

4. A process for the production of condensation products of the benzanthrone series which comprises acting on a compound corresponding to the formula:

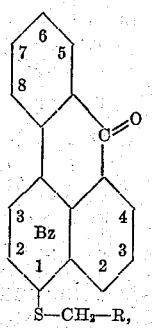

in which R stands for a group capable of being saponified into a carboxylic group, with an alkaline condensing agent, precipitating the condensation product by dilute acid, saponifying the condensation product with caustic alkali and separating the reaction product with an acid.

5. A process for the production of vat dyestuffs of the benzanthrone series which comprises acting on a compound corresponding to the formula:

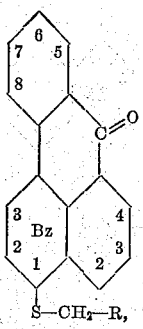

in which R stands for a group capable of being saponified to a carboxylic group, with an alkaline condensing agent, precipitating the condensation product by dilute acid, saponifying it and converting it into a vat dyestuff by the action of a mild oxidizing agent.

6. A process for the production of vat dyestuffs of the benzanthrone series which comprises acting on a compound corresponding to the formula:

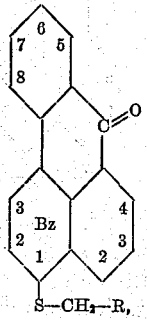

in which R stands for a group capable of being saponified to a carboxylic group, with an alkaline condensing agent in the absence of water, precipitating the condensation product by dilute acid, saponifying it, separating the saponified product by an acid, and converting it into a vat dyestuff by warming its solution in an inert solvent in the presence of a mild oxidizing agent.

7. A process for the production of vat dyestuffs of the benzanthrone series which comprises acting on a compound corresponding to the formula:

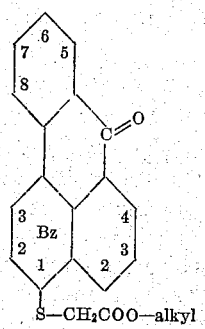

with an alkaline condensing agent in the absence of water, precipitating the condensation product by dilute acid, saponifying it, separating the saponified product by an acid, and converting it into a vat dyestuff by warming its solution in an inert solvent in the presence of a mild oxidizing agent.

8. The process for the production of a vat dyestuff of the benzanthrone series which comprises acting on the ethyl ester of Bzl-benzanthronyl-thioglycollic acid in pyridine with caustic alkali, precipitating the condensation product by dilute acid, saponifying it by warming it with an aqueous caustic alkali solution, precipitating the saponified product by an acid and converting it into a vat dyestuff by warming its solution in trichlorbenzene in the presence of air.

9. As new articles of manufacture condensation products of the benzanthrone series probably corresponding to the formula:

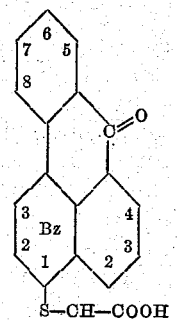

in which the carboxylic group may be substituted by such other groups as are converted into a carboxylic group by saponification, said products being insoluble in dilute acids and obtainable by treating a compound corresponding to the formula:

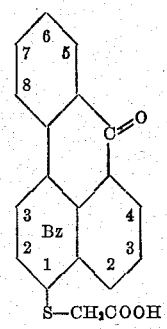

in which the 2-position must be free and the carboxylic group may be substituted in the aforesaid manner with an alkaline condensing agent, said products being soluble in aqueous alcoholic caustic alkali solution as a rule to a red solution with a yellow fluorescence.

10. As new articles of manufacture condensation products of the benzanthrone series corresponding to the formula:

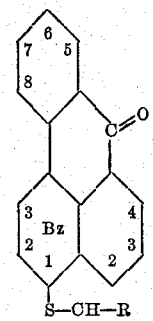

in which R stands for a $CN$, $CONH_2$ or a $COR'$ group, $R'$ standing for an alkyl group, the products being soluble in aqueous alcoholic alkalis as a rule to a red solution with a yellow fluorescence, obtainable from a compound corresponding to the formula:

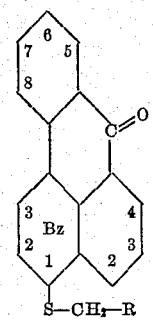

in which R is defined as above, by treatment with an alkaline condensing agent.

11. As a new article of manufacture the compound corresponding to the formula:

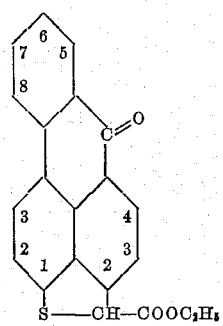

which is insoluble in aqueous sodium carbonate solution, soluble in alcoholic caustic soda solution with intense red color with a bluish tinge and orange yellow fluorescence, and giving a blue solution with a greenish tinge and red fluorescence when dissolved in concentrated sulfuric acid.

In testimony whereof we have hereunto set our hands.

ARTHUR LUETTRINGHAUS.
PAUL NAWIASKY.
ALFRED EHRHARDT.